United States Patent
Wittlinger

[11] 3,891,895
[45] June 24, 1975

[54] GROUND FAULT DETECTION

[75] Inventor: Harold Allen Wittlinger, Pennington, N.J.

[73] Assignee: RCA Corporation, New York, N.Y.

[22] Filed: Apr. 15, 1974

[21] Appl. No.: 461,226

[52] U.S. Cl. ......... 317/18 D; 307/235 A; 317/27 R; 324/51
[51] Int. Cl. ............................................. H02h 3/28
[58] Field of Search .... 317/18 D, 18 R, 33 R, 27 R; 324/51; 328/150; 307/235 A

[56] References Cited
UNITED STATES PATENTS

| | | |
|---|---|---|
| 3,555,359 | 1/1971 | Morris et al. .................... 317/18 D |
| 3,723,814 | 3/1973 | Gross ............................. 317/18 D |

Primary Examiner—James D. Trammell
Attorney, Agent, or Firm—H. Christoffersen; S. Cohen; A. L. Limberg

[57] ABSTRACT

A rectified current wave is produced proportional to the difference in alternating currents passing through a pair of line conductors. This wave is compared in phase with the line voltage to distinguish between an undesired resistive connection from one of the line conductors to ground (a "ground fault") and capacitive unbalance between the line conductors and ground.

16 Claims, 3 Drawing Figures

GROUND FAULT DETECTION

The present invention relates to ground fault detection apparatus as may be used; for example, in ground fault interrupter apparatus for interrupting the supply of a-c power when a resistive ground fault occurs on the power line conductors. used, for The purpose of a ground fault interrupter is to interrupt the supply of a-c power from a source such as an electric outlet when there is a resistive path between that source and ground. Such a path, for example, may be through a person who, if the power is not immediately turned off, will be exposed to the hazard of electric shock and possible electrocution.

Prior art ground fault detectors sense when the magnetic fields around a pair or pairs of proximate a-c power line conductors fail to buck each other out, that is, they sense when the net magnetic field intensity surrounding the conductors increases. An unbalance current is induced proportional to the intensity of this magnetic field which current is indicative of the magnitude of leakage current from a line conductor to ground.

However, the technique above, when straightforwardly applied, is not sufficiently discriminating. Unbalance currents caused by resistive faults, such as offered by a person accidentally interposing himself between a power line conductor and ground, cannot be distinguished from unbalance currents caused by the power line conductors having dissimilar capacitances to ground. Such unbalanced capacitance conditions are typically imposed on the a-c power lines by electric motors and false tripping of the ground fault interrupter circuitry caused by switching motors onto the a-c power lines becomes a nuisance.

The present invention concerns ground fault detection which is arranged to provide decreased sensitivity to unbalance current when its phasing fails to correspond with the phasing of potential on the power line conductors. This reduces the occurrences of ground fault indications attibutable to unbalanced capacitance conditions on the line conductors.

Figure 1:
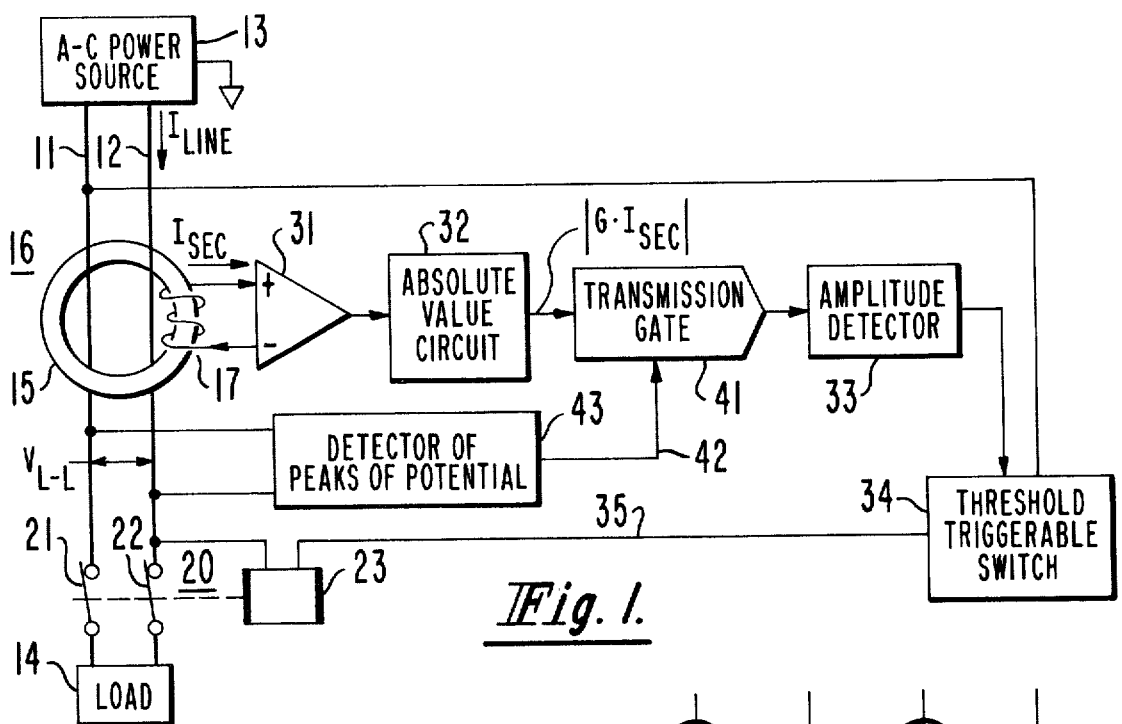
FIG. 1 is a block diagram of ground-fault interrupter apparatus including ground-fault detection apparatus which embodies the present invention.

In FIG. 1, the heavily drawn vertical conductors 11 and 12 are a pair of a-c power line conductors, such as may be used to connect a source 13 of a-c power to a load 14. The source 13 of a-c power is grounded, which ground is referred to as "system ground" and is symbolized by the small triangular symbol to which source 13 is connected. Local "grounds" are symbolized by the conventional symbol of stacked lines and may or may not be referred in potential to system ground. The conductors 11 and 12 are threaded through the toroidal core 15 of a differential current transformer 16 to form its primary windings. So long as the current flowing in one of the conductors 11 and 12 to load 14 is the same as the current returning by the other, there is reasonable assurance that there is no current-carrying resistive path between either of the conductors 11, 12 and ground. That is, there is no resistive fault on the lines, such as would be present if a person had accidentally interposed himself between one of the power line conductors 11, 12 and a point of system ground potential. For this condition of equal and opposite current flows in conductors 11 and 12, the magnetic fields created by these current flows in the primary windings of transformer 16 buck each other out. Therefore, substantially no current flow is induced in the secondary winding 17 of the differential current transformer 16. The current flowing to a load via one of the conductors 11 and 12 will not equal the current returning by the other, however, when either of the following two conditions exist.

The first condition exists when a resistive ground fault appears on conductor 11 or conductor 12. Then, the currents in conductors 11 and 12 will not be equal to each other, since a portion of the current flowing in one conductor will complete its circuit to the source 13 of a-c power through the ground-fault path rather than through the other conductor.

The second condition exists when the capacitance between one of the conductors 11 and ground is not equal to that between the other conductor 12 and ground. This causes a reactive unbalance current to flow in a circuit from the source 13 of a-c power through one of the conductors 11 and 12, through the larger of the capacitances to system ground, and back to the source 13 of a-c power through a ground return path.

Either of the first and second conditions causes the currents in the conductors 11 and 12 to be unequal, although oppositely directed to each other, and consequently, the magnetic fields arising from one of these current flows will only be partially bucked out or cancelled by the other. The resultant magnetic field induces current flow in the secondary winding 17 of the differential amplifier current transformer 16.

Double-pole single-throw switching relay 20 has its switch poles 21 and 22 respectively interposed in conductor 11 and in conductor 12. Now, it is desirable to operate relay 20 such that its poles 21 and 22 will open the conductors 11 and 12 for the condition where a resistive ground-fault occurs between either of the conductors and ground. This will interrupt current flow from pole 21 to load 14 and back to pole 22 and vice versa. If the resistive ground fault is caused by a person touching this portion of the circuit, its disconnection from the source 13 of a-c power will save him from harm. It is undesirable, however, that poles 21 and 22 open the conductors 11 and 12 for the condition where dissimilar capacitances-to-ground of the line conductors 11 and 12 are the primary cause of current flow in the secondary winding 17.

Current flow in the secondary winding 17, $I_{SEC}$, is amplified in an operational amplifier 31 and applied to the input port of an absolute-value circuit 32. The signal at the output port of the absolute-value circuit 32, $|G \cdot I_{SEC}|$, is an amplified and full-wave rectified signal responsive to $I_{SEC}$. In the prior art, the $|G \cdot I_{SEC}|$ signal at the output of the absolute-value circuit 32 would be applied directly to the input port of an amplitude detector 33. The amplitude detector would respond at its output port with a signal proportional to the amplitude of the $|G \cdot I_{SEC}|$ signal to provide control signal to a threshold triggerable switch 34. When this control signal exceeded a threshold value, indicating $I_{SEC}$ to be unacceptably large, the threshold switch 34 would be triggered, causing it to switch from a quiescent state to a state in which an energizing signal is supplied via connection 35 to the coil 23 of relay 20. The relay 20 toggles and its poles 21 and 22 open conductors 11 and 12, so no a-c flows through the portions of these conductors connecting the switch poles 21 and 22 to the load 14.

The threshold triggerable switch 34 comprises, for example, a normally non-conductive device connected in series with the relay coil 23 between conductors 11 and 12 and triggered into conduction by a sufficiently large control signal supplied from detector 33. When the threshold triggerable switch 34 is rendered conductive the line-to-line potential $V_{L-L}$ between conductors 11 and 12 is applied to the coil 23 of relay 20, energizing it, in such an arrangement.

The present invention differs from the prior art in that the signal $|G \cdot I_{SEC}|$ at the output port of absolute value circuit 32 is not applied directly and continuously to the input port of the amplitude detector 33. Rather, the $|G \cdot I_{SEC}|$ signal is selectively applied to the input port of amplitude detector 33. This is done by means of transmission gate 41, which couples the output port of the absolute value circuit 32 and the input port of the amplitude detector 33 together during and only during the individual durations of gating pulses supplied to it via the connection 42. These gating pulses are supplied from the output port of a detector 43 of peaks of potential, namely the peaks of the potential $V_{L-L}$ appearing between conductors 11 and 12.

The detector 43 is not a peak detector in the sense of a detector which responds to the maximum excursions of an applied input signal to provide an output signal related in amplitude to these maximum excursions. Rather, detector 43 is that type of voltage comparator which compares an alternative input signal ($V_{L-L}$) against a threshold range and provides an output pulse whenever that alternating input signal swings sufficiently to exceed the threshold range. That is, detector 43 detects peaks, both relatively positive and relatively negative, of an alternating input signal.

Figure 2:
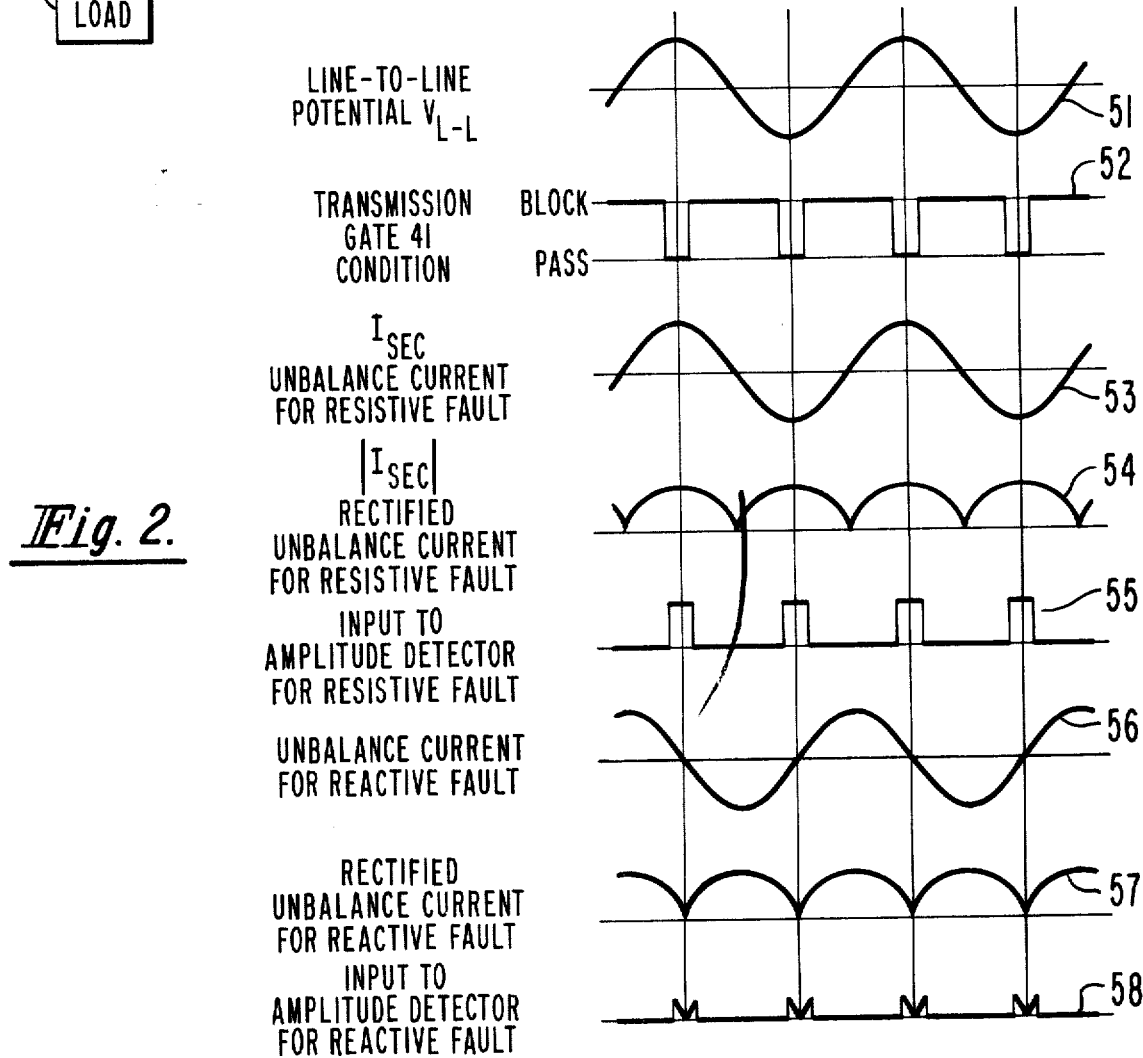
FIG. 2 is a timing diagram showing typical waveforms observed at various points in the FIG. 1 apparatus for both resistive ground-fault and capacitative unbalance conditions.

FIG. 2 is a timing diagram useful for explaining the operation of the FIG. 1 apparatus for both the resistive ground-fault and line-capacitance unbalance conditions and for distinguishing the respective operating characteristics of the apparatus for each of these conditions. Waveform 51 is the sinusoidal line-to-line potential $V_{L-L}$, which is applied to the input port of the detector 43. Waveform 52 shows the waveform of the gating pulses produced at the output port of detector 43 in response to the potential $V_{L-L}$ of waveform 51 applied to its input port. The gating pulses in the waveform 52 are shown in FIG. 2 as being negative-going and the transmission gate 41 for use with such gating pulses would be arranged to be non-conductive except when negative-going gating pulses are applied to it via connection line 42. The base-line of the pulses is shown to correspond to the "block" condition of the transmission gate 41—that is, to its non-conductive condition—and the negative peak of the gating pulses are shown to correspond to a "pass" condition of the transmission gate 41—that is, a conductive condition of transmission gate 41. Alternatively, detector 43 could be arranged to supply positive-going gating pulses during peaks of $V_{L-L}$ and the transmission gate 41 arranged to be normally non-conductive except when positive-going gating pulses are applied to it.

Waveform 53 is the $I_{SEC}$ unbalance current waveform which may occur when a resistive ground-fault occurs between one of the conductors 11 or 12 and system ground. If there were, instead, a resistive ground-fault between the other conductor and ground, the current $I_{SEC}$ would be a mirror-image of waveform 53 about its average-value axis. The important characteristic of the unbalance current $I_{SEC}$ waveform 53 is that its peak values occur substantially concurrently with the peak values of the line-to-line potential $V_{L-L}$. This comes about because the resistive ground-fault, like any other resistor, has an alternating current therethrough which is in the same phasing as the alternating potential applied thereacross.

Waveform 54 is obtained by passing the $I_{SEC}$ current waveform 53 through an absolute-value circuit. The waveform of the signal at the output port of the absolute-value circuit 32 during a resistive ground-fault will be proportional to the rectified unbalance current of waveform 54. This current, appearing at the output port of the absolute-value circuit 32 is selectably coupled to the input port of amplitude detector 33 by the transmission gate 41 during the times when the coupled signal reaches its maximum. The wave-form supplied to the input port of the amplitude detector 33 during a resistive ground-fault is proportional to the wave-form 55. The average value of the energy in this train of pulses tends, as it shall be seen, to be relatively large compared to that for a capacitative unbalance condition. This is because the transmission gate operates to couple the signal at the output port of the absolute value circuit 32 to the input port of the amplitude detector 33 when this signal is of maximum value—if the signal arises because of the presence of a resistive ground-fault.

Waveform 56 is an $I_{SEC}$ unbalance current waveform which occurs when there is a capacitative unbalance in one sense between system ground and the respective conductors 11 and 12. A capacitative unbalance in the opposite sense between system ground and conductors 11 and 12, respectively, would result in a mirror-image of waveform 56 about its average-value axis. The important characteristic of the unbalanced current $I_{SEC}$ waveform 56 is that its average-value axis crossings occur substantially concurrently with the peak values with the line-to-line potential $V_{L-L}$. This comes about because the larger the line capacitances to ground, like any other capacitance, has an alternating current therethrough which leads the alternating potential applied thereacross by 90° of electrical phase angle.

Waveform 57 results when the waveform 56 is passed through an absolute-value circuit. The waveform of the current at the output port of the absolute-value circuit 32 for the condition of capacitative unbalance and no resistive ground-fault will be proportional to the rectified unbalance current of waveform 57. This signal appearing at the output port of the absolute-value circuit 32 is selectively coupled to the input port of amplitude detector 33 by the transmission gate 41 during the gating pulses of waveform 52. These times correspond to a timing of the nulls of the signal proportional to the waveform 57.

The waveform supplied to the input port of the amplitude detector 33, when capacitative unbalanced conditions obtain, but no resistive ground-fault conditions obtain, is proportional to the waveform 58. The relative scales of the waveforms 55 and 58 are the same, and the average value of the energy under the small M-shaped pulses of waveform 58 is only a fraction of the average value of the energy in the well-formed rectangular pulses of waveform 55. Consequently, the response of the amplitude detector 33 to the signal proportional to waveform 55 is substantially more sensitive than its response to the signal proportional to the waveform 58.

The triggering threshold switch 34 can be set to be triggered by resistive ground-faults through which current levels dangerous to human beings flow. Yet, at the same time, this threshold level will not be exceeded by signals arising from capacitative unbalance conditions of the conductors 11, 12 to ground which are of the order of magnitude to be customarily expected for motor loads.

Figure 3:
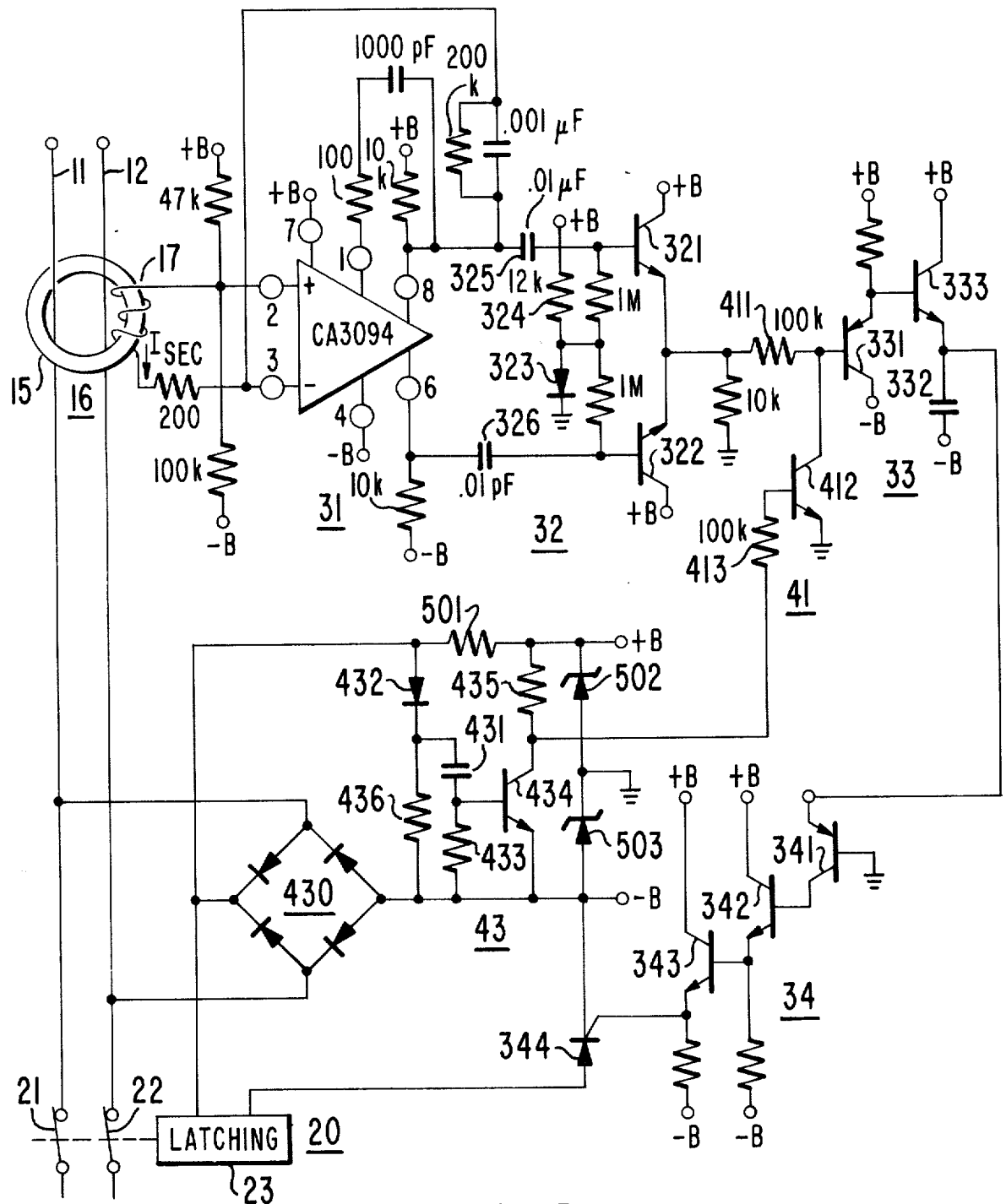
FIG. 3 is a schematic diagram of representative circuitry which may be used in the construction of the FIG. 1 apparatus.

FIG. 3 shows representative, typical circuitry for obtaining the functions shown in the FIG. 1 blocks. Operational amplifier 31 is shown in FIG. 3 to comprise a CA 3094 manufactured by RCA Corporation. As connected, the CA 3094 provides push-pull output signal potentials at its terminals 6 and 8 proportional to the current $I_{SEC}$ flowing between its input terminals 2 and 3. Its non-inverting input terminal 2 has fixed bias applied thereto, and its inverting terminal 3 has a degenerative feedback connection thereto from its output terminal 8.

Common-collector NPN transistors 321 and 322 in the absolute-value circuit 32 have their base-emitter junctions biased just into forward conduction by the potential developed across diode 323, which is itself forward biased by current flow through resistor 324. A positive half cycle of the signal potential at terminal 8 of the CA 3094, as applied to the base electrode of transistor 321 by means of capacitor 325, will bias the base-emitter junction of transistor 321 into increased forward conduction and by emitter-follower action appear at the joined emitter electrodes of transistors 321 and 322. At the same time, the negative half cycle of the signal potential at terminal 6 of the CA 3094, as applied to the base electrode of transistor 322 by means of capacitor 326, reverse biases the base-emitter junction of transistor 322 and so is not passed to the joined emitter electrodes of transistors 321 and 322. On the next half cycle of signal potentials at terminals 8 and 6 of the CA 3094, the negative signal potential applied to the base electrode of transistor 321 reverse biases the base-emitter junction of transistor 321, and the positive signal potential applied to the base electrode of transistor 322 forward-biases the base-emitter junction of transistor 322 and is passed by emitter follower action of transistor 322 to appear at the joined electrodes of transistors 321 and 322.

The foregoing operation recurs whenever an unbalance current $I_{SEC}$ appears in the secondary winding 17. A full-wave rectified output potential is provided at the joined emitter electrodes of transistors 321 and 322, which rectified potential has an amplitude proportional to the absolute value of $I_{SEC}$. Being provided by the alternating emitter-follower actions of transistors 321 and 322, this rectified potential is provided at a relatively low source impedance as compared to the resistance of the resistors used to bias these transistors.

Transmission gate 41 is shown in FIG. 3 as comprising a resistor 411 used as a series element in an L-network together with a transistor 412, the collector-to-emitter path of which is used as a variable-impedance shunt element in the L-network. As will be explained shortly, no base current is applied to transistor 412 during the peaks of the line potential $V_{L-L}$ (during the "pass" condition of wave 52). This makes the collector-to-emitter path of transistor 412 non-conductive. Therefore, the rectified potential at the joined emitter electrodes of transistors 321 and 322 at the output terminal of absolute-value-circuit 32 is passed through resistor 411, without substantial attenuation, to the input terminal of peak detector 33 at the base electrode of transistor 331. On the other hand, during the periods between peaks of $V_{L-L}$ (the "block" condition of wave 52) base current is applied to the base electrode of transistor 412. This makes the collector-to-emitter path of transistor 412 highly conductive. Transistor 412 is then biased into saturation, so its collector-to-emitter path provides a short circuit to local ground potential and inhibits the transmission of rectified potential from absolute-value circuit 32 to peak detector 33.

The transistor 412 is controlled by the left lower portion of the circuit of FIG. 3. It includes a bridge rectifier 430 with input port connected between conductors 11 and 12. The bridge rectifier 430 provides full-wave rectified line-to-line potential, $|V_{L-L}|$, from its output port for application to the series connection of resistor 501 and avalanche diodes 502 and 503. The interconnection of avalanche diodes 502 and 503 provides local ground reference potential, which will be the same potential as system ground potential in some cases and will differ therefrom in other cases. The respective potentials developed at the other ends of avalanche diodes 502 and 503 remote from their interconnected ends provide B+ and B− operating potentials, respectively, which are substantially direct potentials except during average-axis crossings of $V_{L-L}$. These B+ and B− operating potentials supply the rest of the circuitry, as shown, and power supply filter capacitors are not required.

Capacitor 431 is charged up by peaks of the fullwave rectified line potential, $|V_{L-L}|$, appearing at the output port of diode ring 430. This is done by the peaks of line potential forward-biasing diode 432 to provide a conductive path through diode 432, capacitor 431 and resitor 433. The resistor 433 senses the charging current to forward bias the base-emitter junction of transistor 434 during peaks of line-to-line potential $V_{L-L}$. This causes the collector-to-emitter path of transistor 434 to be highly conductive and to saturate thereby clamping its collector electrode to the B− potential at its emitter electrode. The flow of current through resistor 435 from B+ potential is then to the collector electrode of transistor 434, rather than via resistor 413 to the base electrode of transistor 412. Transistor 412 responds to the deprivation of base current during peaks of $V_{L-L}$ by its collector-to-emitter path being non-conductive. This permits full-wave rectified potential from the joined emtter electrodes of transistors 321 and 322 in absolute value circuit 32 to pass via resistor 411 to the base electrode of transistor 331 in peak detector 33.

During the intervals between peaks of $V_{L-L}$, diode 432 is not forward biased, since the potential stored on capacitor 431 exceeds the full-wave rectified line-to-line potential, $|V_{L-L}|$. Capacitor 431 discharges through the serial connection of resistors 436 and 433, the discharge current developing a potential across resistor 433 that reverse-biases the base-emitter junction of transistor 434. This renders the collector-to-emitter path of transistor 434 non-conductive, which permits current to flow between the B+ bus and the base electrode of transistor 412 via a path including resistors 435 and 413. This base current forward biases the base-emitter junction of transistor 412, causing its collector-to-emitter path to become highly conductive and driving transistor 412 into saturation. In this saturated condition, transistor 412 clamps the base electrode of transistor 331 to local ground potential preventing the transmission of signal from the absolute value circuit 32 to the peak detector 33.

Since the amount of charge leaked off capacitor 431 in the interval between peaks $V_{L-L}$ is substantially the same for small (up to 20 percent) changes in the value of $V_{L-L}$, the amount of charge required to re-charge capacitor 431 during peaks of $V_{L-L}$ does not vary greatly either. Therefore, the amount of time required to charge capacitor 431 through the forward conduction resistance of diode 432 is substantially unaffected by the aforesaid small changes in $V_{L-L}$. So, the duty cycle of transmission gate 41, or percentage of the time it is transmissive, is substantially invariant for small changes in $V_{L-L}$. This would permit the amplitude detector 33 to be an averaging type without loss of accuracy in proportioning its output to $I_{SEC}$ and to the relative phase angle between $I_{SEC}$ and $V_{L-L}$.

The particular amplitude detector 33 shown in FIG. 3 is, however, a peak detector providing an output potential across the capacitor 332 which is equal to the peak value of the signal applied to its input terminal at the base electrode of transistor 33. Common-collector transistor 331 is an emitter-follower providing a buffer amplifier between the transmission gate and transistor 333, the base-emitter junction of which is the rectifier element in the peak detector. The base-emitter offset potential of transistor 331 compensates for that of the transistor 333. When the signal potential at the base electrode of transistor 331 increases so does its emitter potential because of emitter-follower action. This applied forward bias to the base-emitter junction of transistor 333 causing its collector-to-emitter path to conduct charge to capacitor 332. As capacitor 332 charges to a potential equal to that at the base electrode of transistor 331, there is no longer forward bias on the base-emitter junction of transistor 333. The collector-to-emitter path of transistor 333 becomes non-conductive, and the charging of capacitor 332 stops.

For the condition in which a resistive ground fault obtains on one of conductors 11 and 12, the input signal applied to the base electrode of transistor 331 is of sufficient magnitude to cause the charging of capacitor 332 to a voltage sufficient to overcome the offset potential of the base-emitter junction of grounded-base amplifier transistor 341 and forward bias that junction. It is this well-defined offset potential that serves as the triggering threshold of the threshold triggerable switch 34. When transistor 341 is biased into conduction, its collector current is supplied to the cascade connection of common-collector amplifier transistors 342 and 343, to be amplified. The amplified collector current of transistor 341 is supplied from the emitter electrode of transistor 343 to initiate conduction of the semiconductor controlled rectifier (SCR) 344. The conduction of the SCR 344 applies current to the coil 23 of relay 20, causing its poles 21 and 22 to open the conductors 21 and 22. The relay 20 latches in this position and must be re-set before a-c power can again flow through conductors 11 and 12.

The various functional blocks shown in FIG. 1 can be realized in various alternative ways from that described in connection with FIG. 3, and one skilled in the art can readily develop a variety of different circuits which embody the present invention. The cascade connection of the absolute-value circuit 32 and the transmission gate 41 can be alternatively arranged with the transmission gate 41 preceding the absolute value circuit 32. However, this will necessitate the transmission gate 41 being able to selectably transmit signals of both positive and negative polarity or swing. Transmission gates with such a capability are known, examples thereof being described in U.S. Pat. Nos. 3,327,133 and 3,457,435.

What is claimed is:

1. Ground-fault detection apparatus for use with a plurality of a-c power line conductors comprising:
   a differential transformer having a plurality of primary windings and a secondary winding, each of said primary windings being arranged for inclusion in one of said a-c power line conductors so that in the absence of a ground fault in any of said power line conductors substantially no a-c signal current will be induced in said secondary winding and during the occurrence of such ground fault a relatively substantial a-c signal current will be induced in said secondary winding;
   a detector responsive to peaks of the potential between a pair of said primary windings to produce a set of control pulses;
   a rectifier;
   a transmission gate having a controlled transmission path responsive to said control pulses which control pulses render the otherwise relatively non-conductive said transmission path relatively conductive; and
   an amplitude detector, having an input circuit intermittently coupled to said secondary winding by means of a cascade connection of said rectifier and said transmission gate, and having an output circuit from which indications of resistive ground faults are supplied.

2. Ground-fault detection apparatus as set forth in claim 1 wherein said rectifier comprises an absolute-value circuit.

3. Ground fault detection apparatus as set forth in claim 1 wherein said rectifier precedes said transmission gate in said cascade, thereby permitting said transmission gate to be of a type capable of selectably transmitting signals of one polarity only.

4. Ground fault detection apparatus as set forth in claim 3 wherein said transmission gate is an L-network comprising a resistor used as the series element in said L-network and a transistor the principal conductive path of which is used as the shunt element in said L-network and has its impedance selectably controlled in response to said control pulses applied to a control electrode of said transistor.

5. Ground fault detection apparatus as set forth in claim 1 wherein said detector responsive to peaks of the potential between a first pair of said primary windings to produce a first set of control pulses comprises:
a full wave rectifier circuit having an input port connected between said first pair of primary windings and having an output port;
a capacitor;
a first and a second resistive elements connected in a first loop with said capacitor;
a diode connected to be in a first serial connection with said capacitor and said first resistive element across the output port of said full-wave rectifier circuit during said peaks;
a transmission amplifier having an input port connected in a second loop with said first resistive element and having an output port connected for supplying said control pulses responsive to charging of said capacitor in said first serial connection.

6. Ground fault detection apparatus for use with a plurality of a-c power line conductors, comprising:
means for detecting unbalance currents having an input port coupled to said plurality of a-c power line conductors and having an output port for providing a signal indicative of when the currents flowing to and fro in said a-c power line conductors are unequal;
a detector responsive to peaks of the potential between a pair of said a-c power line conductors to produce a set of control pulses;
a rectifier;
a transmission gate having a controlled transmission path responsive to said control pulses which control pulses render the otherwise relatively nonconductive said transmission path relatively conductive; and
an amplitude detector, having an input circuit intermittently coupled to the output port of said means for detecting unbalance currents by means of a cascade connection of said rectifier and said transmission gate, and having an output circuit from which indications of resistive ground faults are supplied.

7. Ground fault detection apparatus as set forth in claim 6 wherein said detector responsive to peaks of the potential between a first pair of said primary windings to produce a first set of control pulses comprises:
a full wave rectifier circuit having an input port connected between said first pair of primary windings and having an output port;
a capacitor;
a first and a second resistive elements connected in a first loop with said capacitor;
a diode connected to be in a first serial connection with said capacitor and said first resistive element across the output port of said full-wave rectifier circuit during said peaks;
a transistor amplifier having an input port connected in a second loop with said first resistive element and having an output port connected for supplying said control pulses responsive to charging of said capacitor in said first serial connection.

8. A detector responsive solely to peaks of a potential to provide pulses, said detector comprising:
a full wave rectifier circuit having an input port connected for receiving said potential and having an output port with a first and a second terminals;
a first and a second resistive elements having respective first ends connected to said first terminal and having respective second ends;
a capacitor connected between the second ends of said first and said second resistive elements;
a diode connected between said second terminal and said second end of said second resistive element and poled for conduction of full-wave rectified potential; and
a transistor amplifier having an input port across which said first resistive element is connected and having an output port for providing said pulses.

9. A method of distinguishing resistive ground faults from unbalanced capacitances-to-ground occurring on a pair of power line conductors comprising the following steps:
detecting on a continuing basis when peaks of the potential appear between said pair of power line conductors,
detecting whether there is an unbalanced current flow through said pair of power line conductors,
rectifying the detected unbalanced current flow,
selectively transmitting the rectified detected unbalanced current flow during periods when peaks of potential are detected as appearing between said pair of power line conductors, and
measuring the amplitude of the selectively transmitted rectified detected unbalanced current flow to ascertain when it exceeds a predetermined level, such excess being indicative of a resistive ground fault.

10. A method for distinguishing the condition of a pair of current carrying transmission lines when a resistive path exists between one of these lines and ground from the condition of these lines when the capacitance between one line and ground differs from that between the other line and ground comprising the steps of:
producing a rectified current wave having an amplitude proportional to the difference in currents passing through said lines; and
subsequently comparing the phase of the rectified current wave with that of the line voltage.

11. The method as set forth in claim 10 including the step of:
interrupting the flow of current through said lines responsive to the rectified current being both greater in amplitude than a given value and being substantially in phase with the line voltage.

12. The method of claim 10 wherein the step of comparing the phase comprises:
detecting the amplitude of the rectified current only during the peaks of the line voltage.

13. A ground fault circuit for a pair of alternating current carrying lines comprising, in combination:
means responsive to the current carried by said lines for producing a rectified current of an amplitude proportional to the difference in said currents; and
further, separate means for distinguishing between a condition in which said rectified current has one phase relationship with the voltage across said lines and a condition in which said rectified current has a second phase relationship with said voltage.

14. A ground fault circuit as set forth in claim 13, said means for distinguishing comprising means for distinguishing when said rectified current is substantially in phase with said voltage from when it is substantially ninety degrees out of phase with said voltage.

15. A ground fault circuit as set forth in claim 13 wherein said means for distinguishing comprises means for detecting the amplitude of said rectified wave during the peaks of said voltage.

16. A ground fault circuit as set forth in claim 15, further including:

means responsive to said detected rectified wave for interrupting the current in said lines when said detected current exceeds a predetermined value.

* * * * *

UNITED STATES PATENT OFFICE
CERTIFICATE OF CORRECTION

PATENT NO. : 3,891,895
DATED : June 24, 1975
INVENTOR(S) : Harold Allen Wittlinger It is certified that error appears in the above-identified patent and that said Letters Patent are hereby corrected as shown below:

Column 1, line 4, ";" should read --,--.
Column 1, line 7, delete "used, for".
Column 4, line 36, "if" should be underscored.
Column 4, line 37, "resistive" should be underscored.
Column 4, line 50, after "larger" insert --of--.
Column 7, line 37, "33" should read --331--.
Column 7, line 46, "applied" should read --applies--.
Column 8, line 28, after "a" insert --resistive--.
Column 8, line 29, after "a-c" insert --or capacitative unbalance--.
Column 8, line 31, after "such" insert --resistive--.
Column 8, line 31, after "fault" insert --or capacitative unbalance--.
Column 9, line 6, delete "a" (both occurrences).
Column 9, line 49, delete "a" (both occurrences).
Column 9, line 65, delete "a" (both occurrences).
Column 10, line 41, after "the" insert --further--.

Signed and Sealed this thirteenth Day of April 1976

[SEAL]

Attest:

RUTH C. MASON
Attesting Officer

C. MARSHALL DANN
Commissioner of Patents and Trademarks